United States Patent
Shirasaki et al.

[11] Patent Number: 5,812,304
[45] Date of Patent: Sep. 22, 1998

[54] FARADAY ROTATOR WHICH GENERATES A UNIFORM MAGNETIC FIELD IN A MAGNETIC OPTICAL ELEMENT

[75] Inventors: Masataka Shirasaki; Nobuhiro Fukushima, both of Kawasaki, Japan

[73] Assignee: Fujitsu Limited, Kawasaki, Japan

[21] Appl. No.: 704,946

[22] Filed: Aug. 29, 1996

[30] Foreign Application Priority Data

Aug. 29, 1995 [JP] Japan .................................. 7-219941

[51] Int. Cl.$^6$ ........................................................ G02F 1/00
[52] U.S. Cl. ........................ 359/324; 359/281; 359/283
[58] Field of Search .................... 359/280, 281, 359/283, 258, 484, 320, 324; 372/27, 37, 66

[56] References Cited

U.S. PATENT DOCUMENTS

| 3,376,157 | 4/1968 | Guerci et al. ........................... 359/324 |
| 3,407,364 | 10/1968 | Turner . |
| 3,411,840 | 11/1968 | Robinson . |
| 3,527,577 | 9/1970 | Fan et al. ............................... 359/324 |
| 3,558,214 | 1/1971 | DeLang et al. . |

(List continued on next page.)

FOREIGN PATENT DOCUMENTS

| 56-94326 | 7/1981 | Japan . |
| 57-68818 | 4/1982 | Japan . |
| 57-94715 | 6/1982 | Japan . |
| 57-168221 | 10/1982 | Japan . |
| 57-188014 | 11/1982 | Japan . |
| 58-49916 | 3/1983 | Japan . |
| 59-121313 | 7/1984 | Japan . |
| 59-121314 | 7/1984 | Japan . |
| 60-131523 | 7/1985 | Japan . |
| 60-200225 | 10/1985 | Japan . |
| 60-203914 | 10/1985 | Japan . |
| 60-165933 | 11/1985 | Japan . |
| 60-165934 | 11/1985 | Japan . |
| 60-222815 | 11/1985 | Japan . |
| 60-222818 | 11/1985 | Japan . |
| 61-97629 | 5/1986 | Japan . |
| 1-204021 | 8/1989 | Japan . |
| 02-83523 | 3/1990 | Japan . |
| 2-113019 | 9/1990 | Japan . |
| 6-51255 | 2/1994 | Japan . |

OTHER PUBLICATIONS

Shirasaki et al., "Magnetooptical 2×2 switch for single-mode fibers," *Applied Optics*, vol. 23, No. 19, Oct. 1984, pp. 3271–3276.

Sugaya et al., "Novel configuration for low–noise and wide–dynamic–range Er–doped fiber amplifier for WDM systems," OAA '95, Paper FC3, Jun. 16, 1995 (Davos, Switzerland), 4 pages.

N. Fukushima, H. Onaka, M. Shirasaki, Y. Suzuki, T. Tokumasu, "Non–Mechanical Variable Attenuator Module Using Faraday Effect", presented at the meeting Optical Amplifiers and their Application, held on Jul. 11–13, 1996, in Monterey, California, sponsored and managed by Optical Society of America.

M. Shirasaki, et al., "Compact Optical Isolator for Fibers Using Birefringent Wedges", Applied Optics, vol. 21, No. 23, pp. 42196–4299, (Dec. 1982).

*Primary Examiner*—Loha Ben
*Attorney, Agent, or Firm*—Staas & Halsey

[57] ABSTRACT

A Faraday rotator which includes a magnetic optical element and a magnetic field generating unit. The magnetic optical element has an optical path extending therethrough. The magnetic field generating unit is positioned so as not to obstruct the optical path, and generates a uniform magnetic field in the magnetic optical element. The magnetic field generating unit can include a first magnet unit and a second magnet unit. The first magnet unit is positioned so as not to obstruct the optical path and generates a magnetic field passing through the magnetic optical element. The second magnet unit is positioned so as not to obstruct the optical path and generates a magnetic field passing through the magnetic optical element. The magnetic field generated by the second magnet unit is perpendicular to the magnetic field generated by the first magnet unit and combines with the magnetic field generated by the first magnet unit to produce a uniform magnetic field in the magnetic optical crystal.

52 Claims, 8 Drawing Sheets

U.S. PATENT DOCUMENTS

| | | |
|---|---|---|
| 3,700,307 | 10/1972 | Glenn . |
| 4,305,046 | 12/1981 | Le Floch et al. . |
| 4,387,953 | 6/1983 | Shirasaki et al. ......................... 381/11 |
| 4,548,478 | 10/1985 | Shirasaki ............................... 359/256 |
| 4,581,579 | 4/1986 | Shirasaki . |
| 4,609,257 | 9/1986 | Shirasaki ............................... 359/283 |
| 4,637,027 | 1/1987 | Shirasaki et al. ......................... 372/27 |
| 4,650,289 | 3/1987 | Kuwahara . |
| 4,668,052 | 5/1987 | Shirasaki ............................... 359/251 |
| 4,678,287 | 7/1987 | Buhrer . |
| 4,818,881 | 4/1989 | Tanton et al. . |
| 4,933,629 | 6/1990 | Kozuka et al. . |
| 4,973,120 | 11/1990 | Jopson et al. . |
| 4,984,875 | 1/1991 | Abe et al. . |
| 4,988,170 | 1/1991 | Buhrer . |
| 5,029,953 | 7/1991 | Dexter et al. . |
| 5,033,830 | 7/1991 | Jameson . |
| 5,050,968 | 9/1991 | Ohara .................................... 359/281 |
| 5,052,786 | 10/1991 | Schulz .................................... 359/484 |
| 5,212,446 | 5/1993 | Itoh et al. ............................. 324/244.1 |
| 5,267,078 | 11/1993 | Shiraishi et al. ........................ 359/282 |
| 5,345,329 | 9/1994 | Shirai et al. ............................ 359/282 |
| 5,521,741 | 5/1996 | Umezawa et al. ...................... 359/281 |
| 5,528,415 | 6/1996 | Gauthier et al. ........................ 359/282 |

…
FARADAY ROTATOR WHICH GENERATES A UNIFORM MAGNETIC FIELD IN A MAGNETIC OPTICAL ELEMENT

BACKGROUND OF THE INVENTION

1. Field of the Invention

The present invention relates to a Faraday rotator which applies a magnetic field to a magnetic optical crystal, to thereby rotate the polarization of light passing through the magnetic optical crystal. More particularly, the present invention relates to the positioning of an electromagnet and a permanent magnet of a Faraday rotator for producing the magnetic field applied to the magnetic optical crystal.

2. Description of the Related Art

A Faraday rotator can be used to control the polarized state of light. Generally, a Faraday rotator is based on the physical principle that a polarization plane of light rotates when the light passes through a magnetic field which is parallel to the travelling direction of the light. This physical principle is known as the "Faraday effect".

FIGS. 1(A), 1(B) and 1(C) are diagrams of a conventional Faraday rotator. Referring now to FIG. 1(A), the Faraday rotator includes a magnetic optical crystal 20, an electromagnet 22 and a permanent magnet 24. Electromagnet 22 includes a core 21 and a coil 23. Light travels through magnetic optical crystal 20 along a light path 26. Electromagnet 22 produces a controllable magnetic field which is parallel to light path 26. Permanent magnet 24 produces a fixed magnetic field which is perpendicular to light path 26. The magnetic field produced by electromagnet 22 and the magnetic field produced by permanent magnet 24 combine together to form a resulting magnetic field which magnetizes magnetic optical crystal 20. The magnetization of magnetic optical crystal 20 causes the polarization plane of light travelling along light path 26 to be rotated as the light passes through magnetic optical crystal 20. The angle at which the polarization plane rotates is commonly referred to as the Faraday rotation angle, and can be controlled by controlling the magnetic field produced by electromagnet 22.

Core 21 of electromagnet 22 holds, or is adjacent to, magnetic optical crystal 20 on upper and lower surfaces of magnetic optical crystal 20. However, core 21 must allow light to travel unobstructed along optical path 26. Therefore, core 21 cannot completely cover the upper and lower surfaces of magnetic optical crystal 20. Otherwise, core 21 would obstruct light travelling along optical path 26.

Permanent magnet 24 covers, or is adjacent to, a side of magnetic optical crystal 20. Moreover, permanent magnet 24 can completely cover the side of magnetic optical crystal 20 without obstructing light travelling along light path 26. As a result, permanent magnet 24 can apply a uniform magnetic field 28 throughout magnetic optical crystal 20.

FIG. 1(B) is a top view of the Faraday rotator illustrated in FIG. 1(A). Referring now to FIG. 1(B), core 21 of electromagnet 22 is positioned so as not to block light travelling along optical path 26. Therefore, since light path 26 extends through upper and lower surfaces of magnetic optical crystal 20, core 21 cannot completely cover the upper and lower surfaces of magnetic optical crystal 20. As a result, electromagnet 22 cannot apply a uniform magnetic field throughout magnetic optical crystal 20.

FIG. 1(C) is a diagram illustrating an uneven, or non-uniform, magnetic field produced in optical crystal 20. Referring now to FIG. 1(C), core 21 does not obstruct optical path 26. A magnetic field 30 is generated from the N pole to the S pole of electromagnet 22 and penetrates magnetic optical crystal 20. As illustrated in FIG. 1(C), magnetic field 30 curves to reach the S pole of electromagnet 22. Therefore, the density of magnetic flux generated in magnetic optical crystal 20 is non-uniform throughout magnetic optical crystal 20. This non-uniform magnetic flux complicates control of the Faraday rotation angle.

SUMMARY OF THE INVENTION

Accordingly, it is an object of the present invention to provide a Faraday rotator which applies a uniform magnetic field through a magnetic optical crystal, and which has a relatively small size.

It is also an object of the present invention to provide a Faraday rotator having accurate, simple control of a Faraday rotation angle.

Additional objects and advantages of the invention will be set forth in part in the description which follows, and, in part, will be obvious from the description, or may be learned by practice of the invention.

The foregoing objects of the present invention are achieved by providing a Faraday rotator which includes a magnetic optical element and a magnetic field generating unit. The magnetic optical element has an optical path extending therethrough. The magnetic field generating unit is positioned so as not to obstruct the optical path, and generates a uniform magnetic field in the magnetic optical element.

Objects of the present invention are also achieved by providing a Faraday rotator having a first magnet unit and a second magnet unit. The first magnet unit does not obstruct the optical path and has first and second portions adjacent to opposite sides of a magnetic optical element so that the entire magnetic optical element is between the first and second portions. The first and second portions of the first magnet unit together generate a magnetic field passing through the magnetic optical element. The second magnet unit does not obstruct the optical path and has first and second portions adjacent to opposite sides of the magnetic optical element so that the entire magnetic optical element is between the first and second portions of the second magnet unit. The opposite sides of the magnetic optical element are different from the opposite sides at which the first and second portions of the first magnet unit are positioned. The first and second portions of the second magnet unit together generate a magnetic field passing through the magnetic optical element. The magnetic fields generated by the first and second magnet units interact together to form a resulting magnetic field applied to the magnetic optical element.

Moreover, objects of the present invention are achieved by providing a Faraday rotator which includes a magnetic optical element having an optical path extending therethrough, and a magnet unit. The magnet unit is positioned in the optical path, but has an optical passage slot which allows light travelling along the optical path to pass unobstructed through the magnet unit and the magnetic optical element. The magnet unit generates a magnetic field in the magnetic optical element.

In addition, objects of the present invention are achieved by providing a Faraday rotator which includes a magnetic optical element, a first magnet unit and a second magnet unit. The magnetic optical element has an optical path extending therethrough. The first magnet unit does not obstruct the optical path and has first and second portions adjacent to opposite sides of the magnetic optical element so that the magnetic optical element is between the first and second portions. The first and second portions together generate a magnetic field passing through the magnetic optical element. The second magnet unit has first and second portions adjacent to opposite sides of the magnetic optical element so that the magnetic optical element is between the first and second portions, the opposite sides being different from the opposite sides at which the first and second portions of the first magnet unit are positioned. The second magnet unit extends through the optical path, but has an optical passage slot which allows light travelling along the optical path to pass unobstructed through the second magnet unit and the magnetic optical element. The first and second portions of the second magnet unit together generate a magnetic field passing through the magnetic optical element. The magnetic field generated by the first magnet unit and the magnetic field generated by the second magnet unit interact together to form a resulting magnetic field applied to the magnetic optical element.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 3 (C) is a diagram illustrating a magnetic substance having a magnetic field applied thereto.

DESCRIPTION OF THE PREFERRED EMBODIMENTS

Figure 1A:
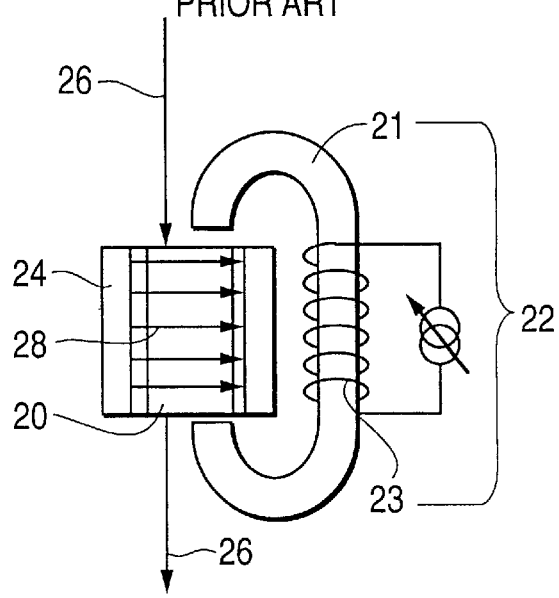
FIGS. 1(A), 1(B) and 1(C) (prior art) are diagrams of a conventional Faraday rotator.

Reference will now be made in detail to the present preferred embodiments of the present invention, examples of which are illustrated in the accompanying drawings, wherein like reference numerals refer to like elements throughout.

Figure 2:
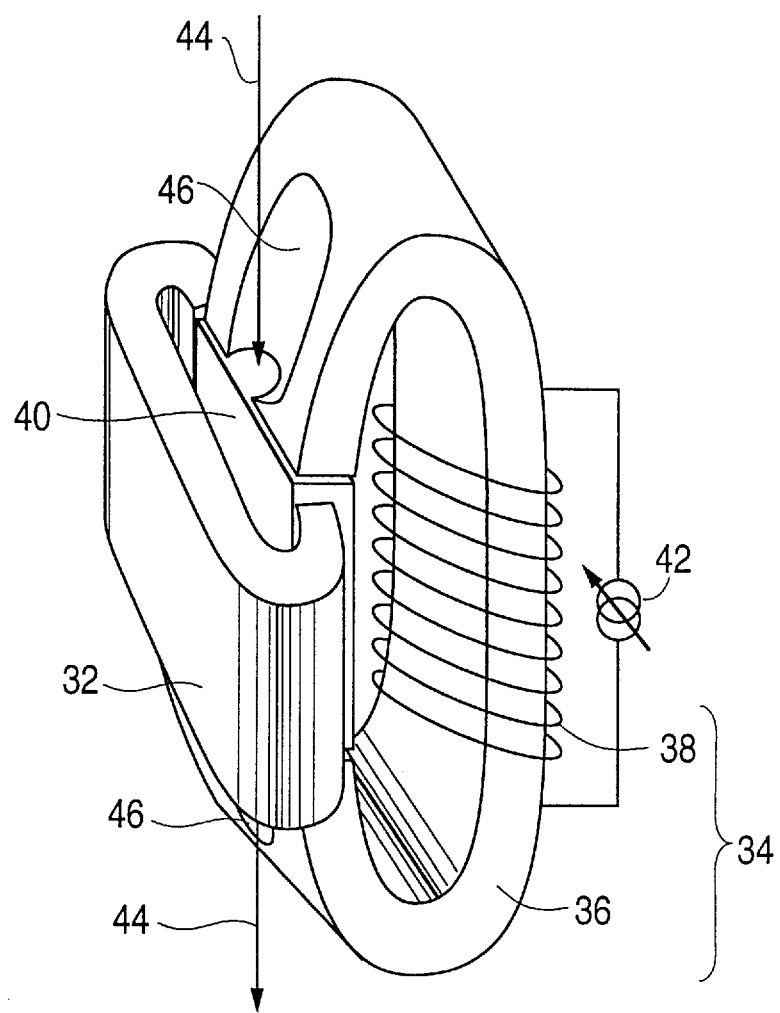
FIG. 2 is a diagram illustrating a Faraday rotator according to an embodiment of the present invention.

FIG. 2 is a diagram illustrating a Faraday rotator according to an embodiment of the present invention. Referring now to FIG. 2, the Faraday rotator comprises a permanent magnet 32 and an electromagnet 34. Electromagnet 34 includes a magnetic core 36 and a coil 38, for applying a magnetic field to a magnetic optical crystal 40 formed as a thin plate. An electric source 42 is connected to coil 38, and has a changeable voltage and polarity so that a changeable electric current can be supplied to coil 38. Electromagnet 34 has S and N poles which can be exchanged by changing the polarity of electric source 42.

Light travels through the Faraday rotator along an optical path 44. Permanent magnet 32 applies a magnetic field which is perpendicular to optical path 44. Electromagnet 34 applies a magnetic field which is parallel to optical path 44. Moreover, magnetic core 36 has an optical passage slot 46 through which optical path 44 passes, so that light can pass through the Faraday rotator unobstructed by magnetic core 36.

A magnetic field parallel to the travelling direction of light travelling along optical path 44 is changed by controlling the current in electromagnet 34. A constant electric field is applied perpendicular to the travelling direction of light travelling along optical path 44 by permanent magnet 32. This constant electric field magnetically saturates magnetic optical crystal 40, thereby preventing the rotation angle of optical polarization from discontinuously varying through an unsaturated magnetic optical crystal. Thus, the magnetization of the Faraday rotator remains saturated by permanent magnet 32 as a magnetic field generated by electromagnet 34 is changed.

In FIG. 2, electromagnet 34 represents a magnet unit positioned in optical path 44. However, electromagnet 34 includes optical passage slot 46 to allow light travelling along optical path 44 to pass unobstructed through electromagnet 34 and magnetic optical crystal 40.

The magnetic saturation provided by permanent magnet 32 provides important benefits. For example, to change the Faraday rotation angle, an electric current flowing through coil 42 is changed. However, if the Faraday rotator illustrated in FIG. 2 did not include permanent magnet 32, the magnetization in magnetic optical crystal 40 would change as in a hysteresis loop (discussed in more detail below, with reference to FIG. 3(A)) when the electric current flowing through coil 42 is changed. Therefore, permanent magnet 32 allows the intensity of the magnetic field obtained by adding the magnetic field from electromagnet 34 to the magnetic field from permanent magnet 32 to magnetically saturate the magnetic optical crystal 40.

Magnetic saturation caused by the permanent magnet is more fully explained with reference to FIGS. 3(A), 3(B) and 3(C).

Figure 3A:
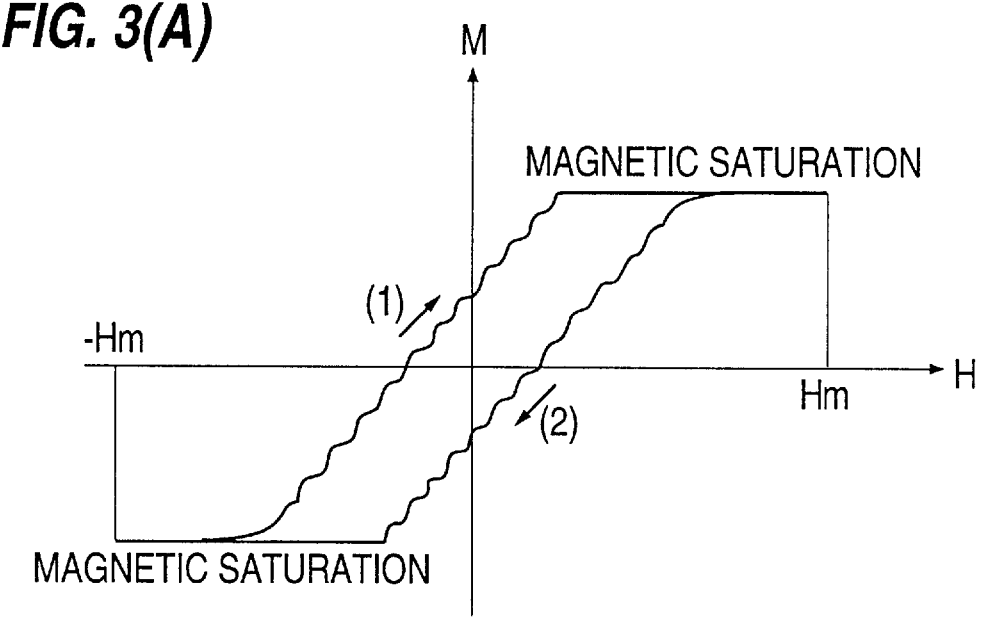
FIG. 3 (A) is a diagram illustrating a magnetic hysteresis loop of a magnetic object.
FIG. 3(B) is a diagram illustrating magnetic domains in a magnetic substance.

FIG. 3(A) is a diagram illustrating a magnetic hysteresis loop of a magnetic object. Referring now to FIG. 3(A), when a magnetic field H is applied to a magnetic object, a spontaneous magnetization arises. FIG. 3(A) represents the strength of the magnetization M when the magnetic field H is changed between Hm and –Hm. As illustrated in FIG. 3(A), the magnetization M will not become greater than a magnetic saturation level. This magnetic saturation level occurs if the intensity of the magnetic field H reaches a specific level. As the intensity of the magnetic field H increases, the magnetization M follows a path along route (1). As the intensity of the magnetic field H decreases, the magnetization M follows a path along route (2).

Figure 3B:
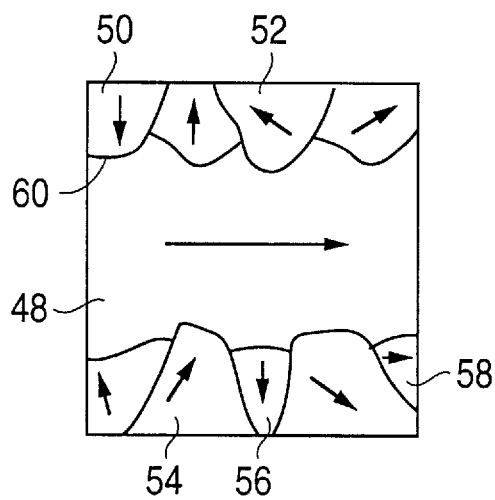

FIG. 3(B) is a diagram illustrating the magnetic domain in a magnetic substance. Referring now to FIG. 3(B), magnetic domains 48, 50, 52, 54, 56 and 58 are enclosed by magnetic walls 60 in a magnetic substance. Each magnetic domain 48, 50, 52, 54, 56 and 58 has a magnetization (indicated by an arrow) of a unique intensity and direction.

Figure 3C:
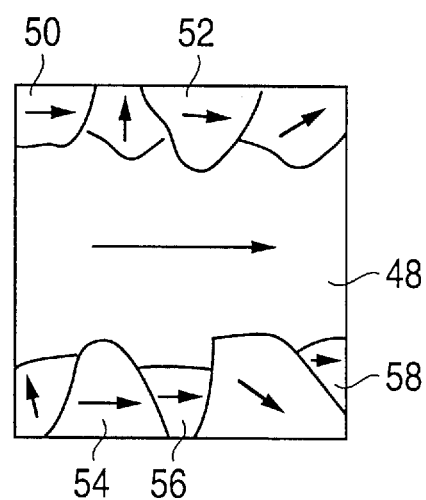

FIG. 3(C) is a diagram illustrating the magnetic substance having a magnetic field applied thereto. As the intensity of the magnetic field applied to the magnetic substance increases, the magnetization of a specific direction and intensity of each magnetic domain 48, 50, 52, 54, 56 and 58 is gradually arranged in the same direction. For example, the magnetization directions of magnetic domains 48, 50, 52, 54, 56 and 58 are changed from the directions illustrated in FIG. 3(B) to the directions illustrated in FIG. 3(C). The rotation of the magnetization direction is represented as a discontinuous change in magnetization of the entire magnetic optical crystal, and discontinuously changes the density of the magnetic flux.

When the intensity of the applied magnetic field is intensified and therefore the magnetization directions are arranged to match each other, the magnetic walls between magnetic domain 48 and magnetic domains 50, 52, 54, 56 and 58 automatically disappear to provide one large magnetic domain. With an increasing intensity of an applied magnetic field, magnetic domain 48 gets larger, and finally the entire magnetic substance becomes a single magnetic domain. This situation is commonly referred to as "magnetic saturation".

Further, the routes (1) and (2) illustrated in FIG. 3(A) indicate a non-smooth hysteresis loop. Thus, in a hysteresis loop, the density of the magnetic flux discontinuously changes by the discontinuous change of the magnetization even if the intensity of the magnetic field H is continuously changed. In such a case, the Faraday rotation angle of light passing through a magnetic optical crystal would be discontinuously changed. Saturation caused by permanent magnet 32 in FIG. 2 prevents such problems.

Moreover, the density of a resulting magnetic flux is obtained by adding the magnetic field to the magnetization. Therefore, a magnetic flux density in a magnetic optical crystal indicates different values even if the intensity of the applied magnetic field remains the same. Since the Faraday rotation angle is determined by the magnetic flux density in the magnetic optical crystal, a different Faraday rotation angle may be produced even if the same intensity of the magnetic field is applied, thereby complicating the entire control of the Faraday rotator.

Therefore, permanent magnet 32 of the Faraday rotator illustrated in FIG. 2 magnetically saturates magnetic optical crystal 40 and provides a constant magnetic intensity. Since the intensity of the magnetization is constant even if the intensity of the magnetic field changes, the density of the magnetic flux in magnetic optical crystal 40 and the Faraday rotation angle do not discontinuously change.

Referring now to FIG. 2, when the Faraday rotation angle is changed, the electric current flowing through coil 38 is controlled to modify the intensity of the magnetic field generated by electromagnet 34. The direction of the magnetic field applied to magnetic optical crystal 40 is changed by adding the magnetic field generated by electromagnet 34 to the magnetic field generated by permanent magnet 32 as vectors. Therefore, as the direction of the magnetic field changes, the direction of the magnetization is changed with the magnetization remaining saturated. As a result, the components of the magnetization parallel to optical path 44 change, thereby changing the Faraday rotation angle.

To obtain a uniform magnetic field using electromagnet 34 extending parallel to optical path 44 and providing a magnetic field parallel to optical path 44, optical passage slot 46 is provided in magnetic core 36, as shown in FIG. 2, SO that the magnetic pole of magnetic core 36 can cover the upper or lower surface of magnetic optical crystal 40. Two electromagnets can be provided to form a uniform magnetic field. However, electromagnets are typically much larger than permanent magnets. As a result, the entire Faraday rotator becomes an undesireably large-scale device.

Figure 1B:
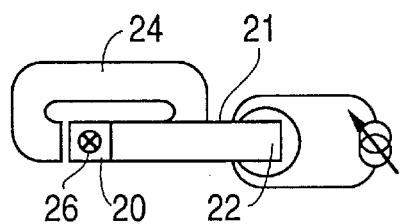
Figure 1C:
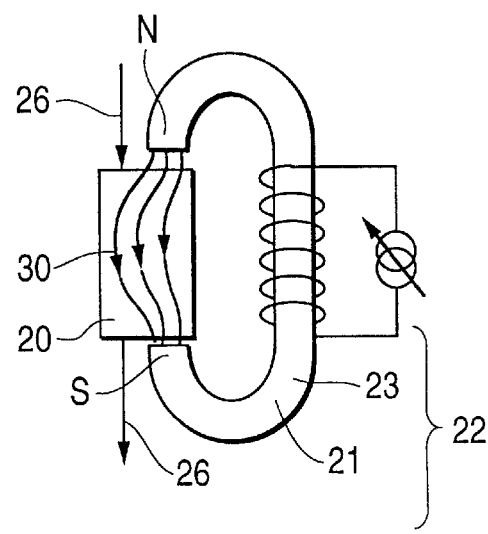

In view of the above, a Faraday rotator according to the embodiments of the present invention as illustrated in FIG. 2 may provide an optical path which is unobstructed by electromagnet 34. However, such a Faraday rotator applies a magnetic field which is not completely uniform throughout magnetic optical crystal 40 since magnetic core 36 of electromagnet 34 does not completely cover the sides of magnetic optical crystal 40. More specifically, optical passage slot 46 provides an open area which is not covered by magnetic core 36. As a result, a completely uniform magnetic field will not be generated in magnetic optical crystal 40. However, the Faraday rotator illustrated in FIG. 2 will provide a significantly more uniform magnetic field in a magnetic optical crystal as compared to the Faraday rotator illustrated in FIGS. 1(A), 1(B) and 1(C).

Figure 4A:
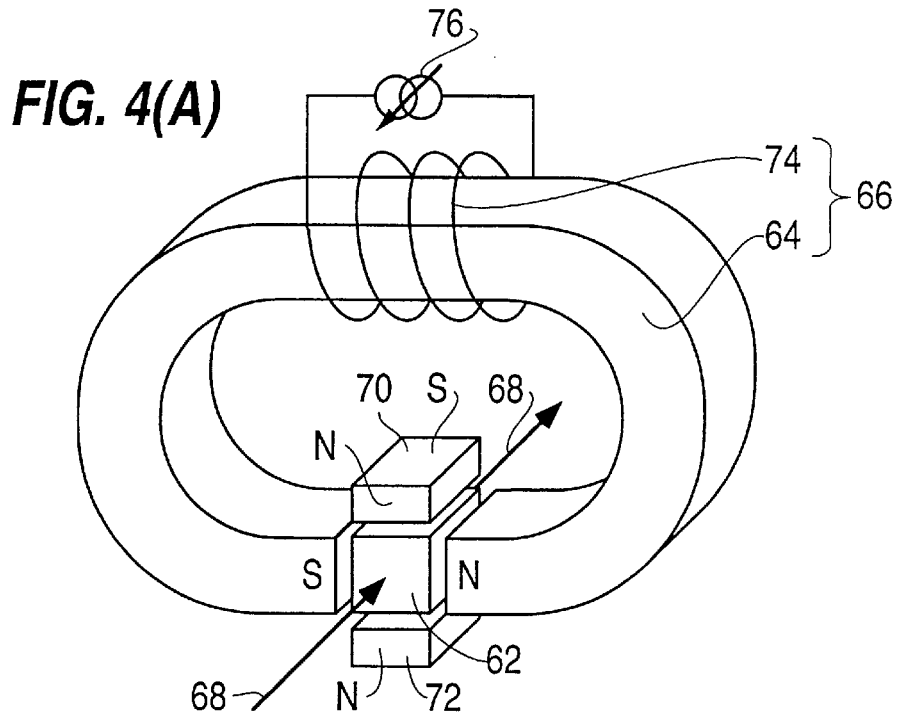
FIG. 4(A) is a diagram illustrating a Faraday rotator according to an additional embodiment of the present invention.

FIG. 4(A) is a diagram illustrating a Faraday rotator according to an additional embodiment of the present invention. The Faraday rotator illustrated in FIG. 4(A) is similar to the Faraday rotator illustrated in FIG. 2, except the arrangement of a permanent magnet and an electromagnet is different.

Referring now to FIG. 4(A), a magnetic optical crystal 62 is a square pole. There are many different types of material which can be used for magnetic optical crystal 62; however, an appropriate material is YIG ($Y_3Fe_5O_{12}$; yttrium-iron-garnet). Otherwise, the YIG can be $(Bi_xTb_{3-x})$ $Fe_5O_{12}$ and $(TbHoBi)_3Fe_5O_{12}$, that is, replacement with terbium or bismuth.

A magnetic core 64 of an electromagnet 66 has N and S poles which are adjacent to opposite sides of magnetic optical crystal 62, and applies a magnetic field which is perpendicular to an optical path 68. Permanent magnets 70 and 72 are square poles and are mounted, or adjacent to, opposite sides of magnetic optical crystal 62. Permanent magnets 70 and 72 apply a magnetic field which is parallel to optical path 68 and uniform throughout magnetic optical crystal 62.

Generally, permanent magnets are relatively small and have intense magnetism. Therefore, permanent magnets (such as permanent magnets 70 and 72) can easily provide a uniform magnetic field. Moreover, the use of two permanent magnets still provide a relatively small-sized Faraday rotator. Moreover, the permanent magnets can be arranged so that optical path 68 is not obstructed by the permanent magnets, as illustrated in FIG. 4(A).

Electromagnet 66 includes a coil 74 which receives a current from an electric source 76. By applying a magnetic field perpendicular to optical path 68 with electromagnetic 66 as illustrated in FIG. 4(A), a magnetic core does not have to be provided with an optical passage slot (such as optical passage slot 46 illustrated in FIG. 2). Further, only one electromagnet 66 is required to apply a uniform magnetic field to magnetic optical crystal 62. This is a significant advantage of the present invention, since a magnetic core of an electromagnet is relatively large and the use of more than one electromagnet will significantly increase the size of the Faraday rotator.

Moreover, the relative positioning of magnetic core 64 of electromagnet 66 and optical path 68 allows electromagnet 66 to apply a perpendicular magnetic field to optical path 68, and allows magnetic core 64 to be close to magnetic optical crystal 62. As a result, the driving electric current can be reduced, and a uniform magnetic field can be applied.

Figure 4B:
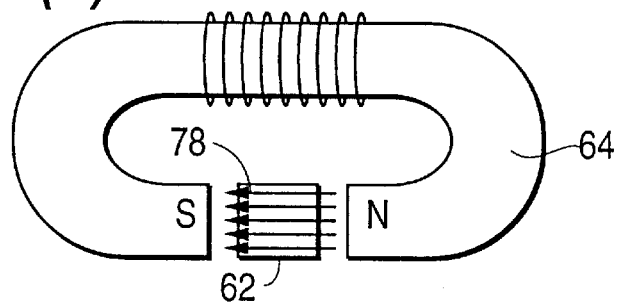
FIG. 4(B) is a diagram illustrating magnetic fields produced by an electromagnet of the Faraday rotator illustrated in FIG. 4(A).

FIG. 4(B) is a diagram illustrating magnetic fields produced by an electromagnet of the Faraday rotator illustrated in FIG. 4(A). More specifically, FIG. 4(B) shows the magnetic field applied by electromagnet 66 to magnetic optical crystal 62.

Referring now to FIG. 4 (B), the S and N poles of magnetic core 64 are designed to completely cover opposite sides of magnetic optical crystal 62. Therefore, the magnetic flux of an applied magnetic field 78 are almost parallel, and produce a uniform magnetic field.

Figure 4C:
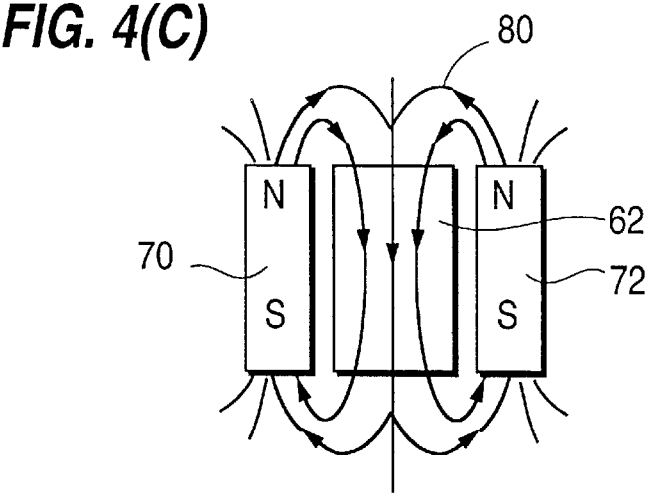
FIG. 4(C) is a diagram illustrating magnetic fields produced by permanent magnets of the Faraday rotator illustrated in FIG. 4(A).

FIG. 4(C) is a diagram illustrating a magnetic field produced by permanent magnets 70 and 72 of the Faraday rotator illustrated in FIG. 4(A). Referring now to FIG. 4(A), permanent magnets 70 and 72 are adjacent to, or hold, magnetic optical crystal 62 on opposite sides. The S and N poles of permanent magnets 70 and 72 face the same direction to apply a magnetic field in a fixed direction to magnetic optical crystal 62. As illustrated in FIG. 4(C), the magnetic flux 80 of each permanent magnet 70 and 72 is emitted from the N pole of the respective permanent magnet 70 or 72, curve outside the permanent magnet and reach the corresponding S pole. Magnetic flux 80 pass through magnetic optical crystal 62 while travelling from N pole to S pole. As a result, a magnetic field parallel to optical path 68 is applied to magnetic optical crystal 62. Such a travel path of a magnetic field is commonly referred to as an "open magnetic path". By contrast, the travel path of the magnetic field illustrated in FIG. 4(B) is commonly referred to as a "closed magnetic path".

The sides of permanent magnets 70 and 72 are formed in a similar shape (for example, as a flat surface) to magnetic optical crystal 62, and are provided at opposite sides of magnetic optical crystal 62. Accordingly, a uniform magnetic field can be applied to the entire magnetic optical crystal 62.

Using conventional materials such as crystals developed by a liquid phase epitaxial (LPE) method, magnetic optical crystal 62 preferably has a thickness of 300–500 $\mu$m, corresponding to the distance required to rotate a polarization plane by 45 degrees with the incident light of a typical wavelength of 1.55 $\mu$m. Also, magnetic optical crystal 62 preferably has an incident surface having a 1 mm-square area according to the thickness of the incident light. A typical material for a magnetic optical crystal is, for example, $(GdBi)_3(FeAlGa)_5O_{12}$.

The shape of magnetic optical crystal 62 is, for example, a cube having three sides of approximately 2 mm. The size of permanent magnets 70 and 72 is, for example, 2 mm×2 mm×4 mm. The size of electromagnet 66 is, for example, approximately 8 mm×10 mm×4 mm. Thus, the permanent magnets are much smaller than the electromagnet. Therefore, a Faraday rotator according to the above embodiments of the present invention can be much smaller than a conventional Faraday rotator having a plurality of electromagnets for producing a uniform magnetic field.

Figure 5A:
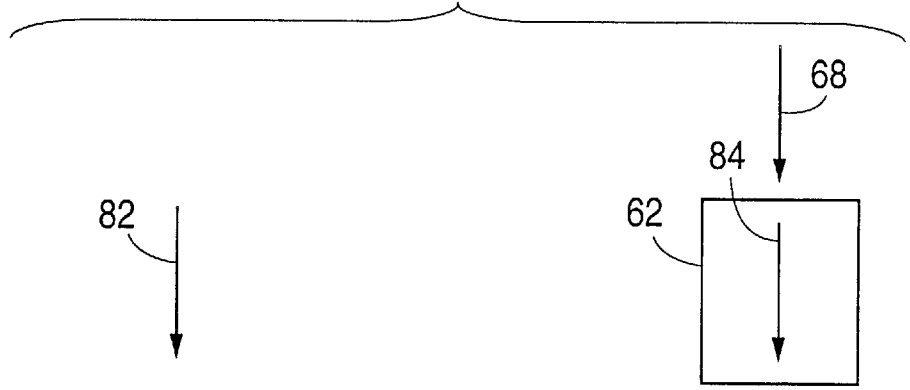
FIGS. 5(A), 5(B) and 5(C) are diagrams illustrating the relationship between a magnetic field applied to a magnetic optical crystal and the magnetization of the magnetic optical crystal, of the Faraday rotator illustrated in FIGS. 4(A), 4(B) and 4(C), according to an embodiment of the present invention.
Figure 5B:
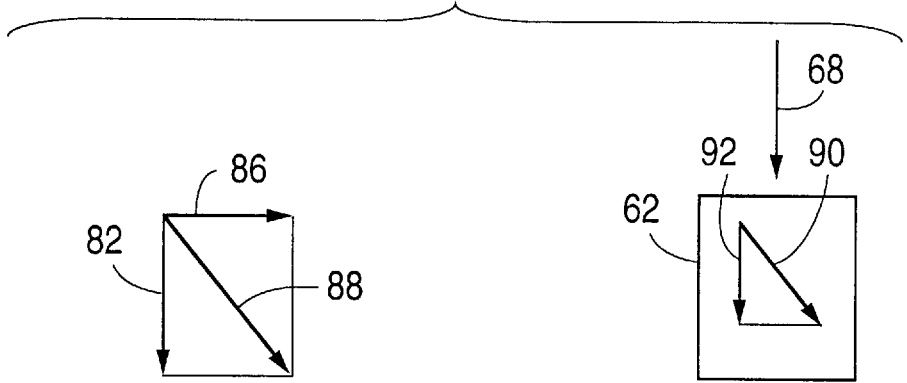
Figure 5C:
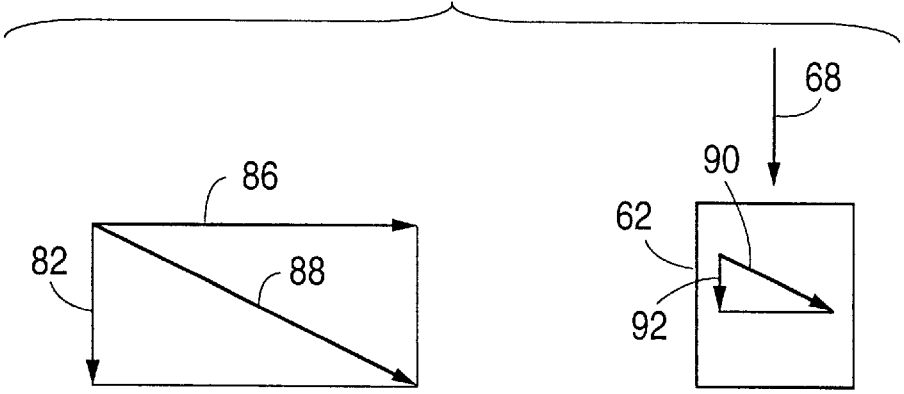

FIGS. 5(A), 5(B) and 5(C) are diagrams illustrating the relationship between a magnetic field applied to a magnetic optical crystal and the magnetization of the magnetic optical crystal, of the Faraday rotator illustrated in FIGS. 4(A), 4(B) and 4(C), according to an embodiment of the present invention. More specifically, FIGS. 5(A), 5(B) and 5(C) show the relationship between the magnetic field applied by an electromagnet and a permanent magnet and the resulting magnetization of a magnetic optical crystal.

FIG. 5(A) shows a situation where no magnetic field is applied by electromagnet 66, but a magnetic field 82 is provided by permanent magnets 70 and 72. Magnetic field 82 is parallel to optical path 68. Similarly, a magnetization 84 is generated in magnetic optical crystal 62 by magnetic field 82. Magnetization 84 is parallel to optical path 68. However, magnetization 84 is saturated by magnetic field 82. With magnetization 84 illustrated in FIG. 2(A), if light travelling along optical path 68 is received by magnetic optical crystal 62, the Faraday rotation angle exhibits the maximum value.

FIG. 5(B) shows a situation where a magnetic field 86 is applied by electromagnet 66 and magnetic field 82 is applied by permanent magnets 70 and 72. Magnetic field 86 is perpendicular to magnetic field 82, so that a resulting magnetic field 88 applied to magnetic optical crystal 62 is a vector combination of magnetic field 82 and magnetic field 86, as shown in FIG. 5(B). Since the intensity of magnetic field 82 applied by permanent magnets 70 and 72 is fixed, the components of the resulting magnetic field 88 which are parallel to optical path 68 remain unchanged.

Magnetization 90 generated in magnetic optical crystal 62 is parallel to applied magnetic field 88, and therefore oblique to optical path 68. The intensity of applied magnetic field 88 becomes higher, but magnetization 90 in magnetic optical crystal 62 is saturated by magnetic field 82 applied by permanent magnets 70 and 72. Therefore, the intensity of magnetization 90 remains unchanged. As a result, magnetization 90 remains unchanged in intensity, but changes in direction. A component 92 of magnetization 90 parallel to optical path 68 is smaller than a component of magnetization 84 (see FIG. 5(A)) parallel to optical path 68, and the Faraday rotation angle becomes correspondingly smaller.

FIG. 5(C) shows a case where the magnetic field applied by electromagnet 66 is more intense than the magnetic field applied by electromagnet 66 in FIG. 5(B). Referring now to FIG. 5(C), magnetic field 88 applied to magnetic optical crystal 62 is a combination of magnetic field 82 of fixed-strength permanent magnets 70 and 72 and magnetic field 86 of electromagnet 66. The strength of magnetic field 88 is at a maximum in FIG. 5(C), as compared to the magnetic fields illustrated in FIGS. 5(A) and 5(B). When magnetic field 88 of FIG. 5(C) is applied to magnetic optical crystal 62, magnetization 90, parallel to applied magnetic field 88, is generated. Since magnetization 90 has already been saturated, the magnetizing force remains unchanged. As a result, the component 92 of magnetization 90 parallel to optical path 68 becomes smaller than in the cases illustrated in FIGS. 5(A) and 5(B). Therefore, the Faraday rotation angle is the smallest in FIG. 5(C), as compared to FIG. 5(A) and 5(C).

Thus, the Faraday rotation angle can be controlled by changing the intensity of a magnetic field applied by electromagnet 66 to magnetic optical crystal 62. Assuming that the Faraday rotation angle is 45° when the magnetic field is applied only by permanent magnets 70 and 72, the control range of the Faraday rotation angle is approximately 0°–45°.

Figure 6A:
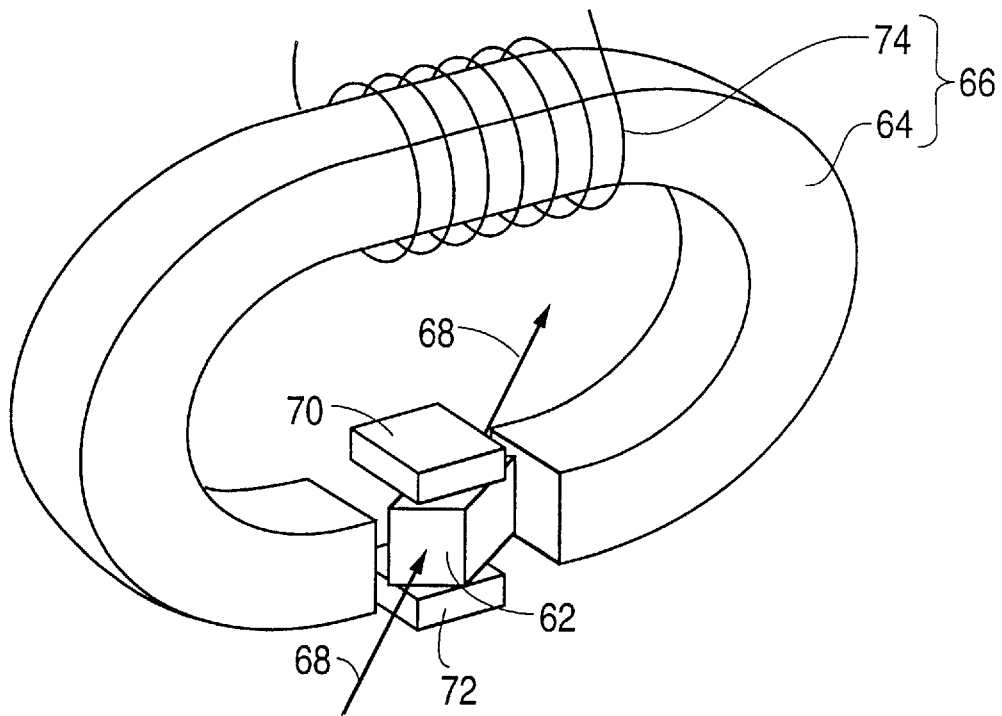
FIG. 6(A) is a diagram illustrating a Faraday rotator according to a further embodiment of the present invention.

FIG. 6(A) is a diagram illustrating a Faraday rotator according to a further embodiment of the present invention. Referring now to FIG. 6(A), permanent magnets 70 and 72 and electromagnet 66 are oblique with respect to the direction of optical path 68. As with previously described embodiments of the present invention, the magnetic field of permanent magnets 70 and 72 is combined with the magnetic field of electromagnet 66, to produce a resulting magnetic field which is applied to magnetic optical crystal 62. However, according to the embodiment of the present invention as illustrated in FIG. 6(A), the magnetic field produced by permanent magnets 70 and 72 and the magnetic field produced by electromagnet 66 are not parallel or perpendicular to optical path 68, and, instead, are oblique with respect to optical path 68.

It is not required for the magnetic field produced by permanent magnets 70 and 72 and the magnetic field produced by electromagnet 66 to both be oblique with respect to optical path 68. Instead, for example, permanent magnets 70 and 72 can be positioned to provide a magnetic field which is oblique with respect to optical path 68, with electromagnet 66 producing a magnetic field which is perpendicular or parallel to optical path 68. Alternatively, electromagnet 66 can be positioned to produce a magnetic field which is oblique with respect to optical path 68, with permanent magnets 70 and 72 positioned to produce a magnetic field which is perpendicular or parallel to optical path 68. In these cases, the magnetic field applied by electromagnet 66 to magnetic optical crystal 62 can be optionally set to be in a range from a normal (that is, a perpendicular line) to optical path 68 to a 45° obliqueness to optical path 68. Similarly, the magnetic field applied by permanent magnets 70 and 72 to magnetic optical crystal 72 can be optionally set to be in a range from a parallel line to optical path 68 to a 45° obliqueness.

However, permanent magnets 70 and 72 and magnetic core 64 should not block, or disturb, optical path 68. If electromagnet 66 and permanent magnets 70 and 72 obstruct optical path 68, it may be necessary to change the shape of magnetic core 64 and/or permanent magnets 70 and 72 so that optical path 68 will allow light to appropriately pass therethrough. (See, for example, FIG. 2, illustrating magnetic core 36 having an optical passage slot 46 formed therein so as not to obstruct an optical path.) If electromagnet 66 and permanent magnets 70 and 72 require reshaping, then a resulting magnetic field applied to a magnetic optical crystal becomes non-uniform, in a similar manner as with the Faraday rotator illustrated in FIG. 2. As a result, the Faraday rotator will undesireably affect the Faraday rotation angle.

Figure 6B:
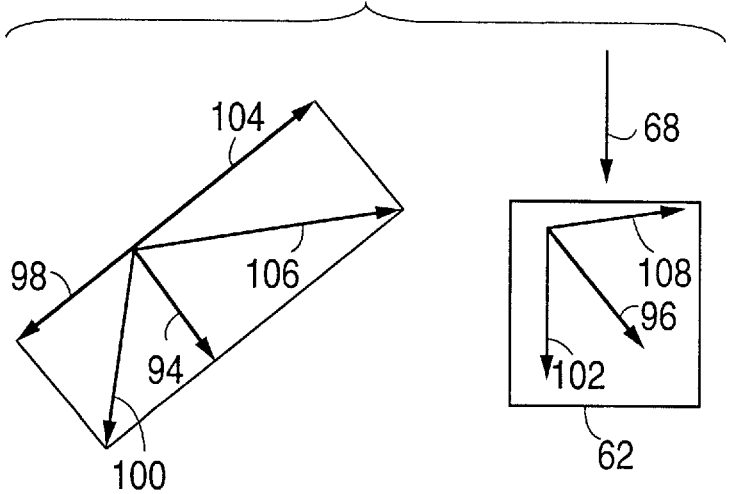
FIG. 6(B) is a diagram illustrating the relationship between a magnetic field applied to a magnetic optical crystal and magnetization, of the Faraday rotator illustrated in FIGS. 6(A), according to an embodiment of the present invention.

FIG. 6(B) is a diagram illustrating the relationship between a magnetic field applied to magnetic optical crystal 62 and the resulting magnetization of magnetic optical crystal 62, of the Faraday rotator illustrated in FIG. 6(A), according to an embodiment of the present invention. Referring now to FIG. 6(B), permanent magnets 70 and 72 generate a magnetic field 94. When no magnetic field is generated by electromagnet 66, magnetic field 94 is applied to magnetic optical crystal 62, to produce a magnetization 96. When electromagnet 66 applies a magnetic field 98, then magnetic field 98 is combined with magnetic field 94 to produce a resulting magnetic field 100. Resulting magnetic field 100 is applied to magnetic optical crystal 62, to produce a magnetization 102. Similarly, when electromagnet 66 applies a magnetic field 104, then magnetic field 104 is combined with magnetic field 94 to produce a resulting magnetic field 106. Resulting magnetic field 106 is applied to magnetic optical crystal 62, to produce a magnetization 108.

As illustrated in FIG. 6(B), magnetizations 96, 102 and 108 are different in direction, but the same in force. Therefore, magnetizations 96 and 102 each have a vector component which is parallel to optical path 68, and extends "downwards" in FIG. 6(B). By contrast, magnetization 108 has a vector component which is parallel to optical path 68, but extend "upwards" in FIG. 6(B). As a result, the Faraday rotations generated by magnetizations 96 and 102 are different in rotation angle but are the same in rotation direction of a polarization plane because the magnetic field vector component parallel to optical path 68 proceeds downward. By contrast, the Faraday rotation generated by magnetization 108 is opposite to the rotating direction produced by magnetizations 96 and 102.

Therefore, according to the embodiment of the present invention illustrated in FIG. 6(A), the rotating direction of the polarization plane of incident light can be changed by positioning electromagnet 66 and permanent magnets 70 and 72 to provide magnetic fields which are oblique with respect optical path 68.

Figure 7:
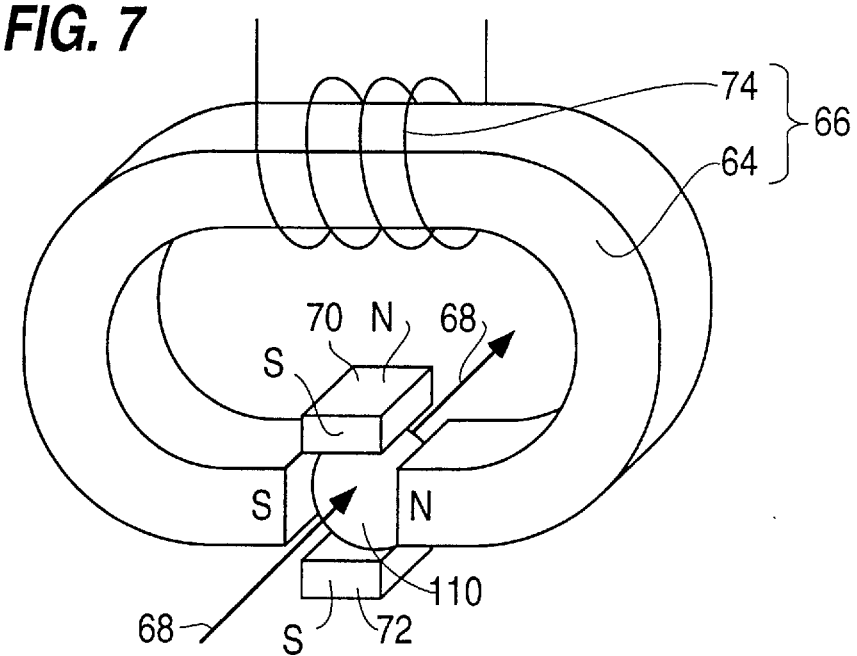
FIG. 7 is a diagram illustrating a Faraday rotator according to an additional embodiment of the present invention.

FIG. 7 is a diagram illustrating a Faraday rotator according to an additional embodiment of the present invention. Referring now to FIG. 7, a magnetic optical crystal 110 is sphere-shaped.

According to embodiments of the present invention as illustrated in FIG. 7, magnetic optical crystal 110 is sphere-shaped to reduce the influence of changes in a demagnetizing field generated in magnetic optical crystal 110 by a change of directions of the applied magnetic field. More specifically, a sphere-shaped magnetic optical crystal 110 is independent of directions, thereby reducing direction dependence of demagnetizing field and effectively applying a uniform magnetic field.

Figure 8A:
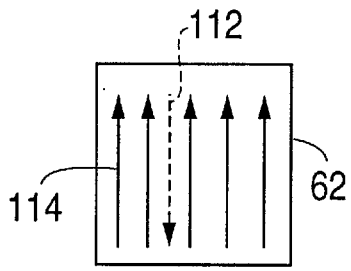
FIGS. 8(A) and 8(B) are diagrams illustrating magnetic fields generated in a magnetic optical crystal in the form of a square pole, according to an embodiment of the present invention.
Figure 8B:
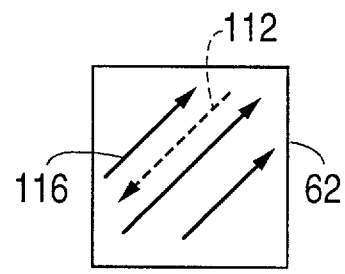

FIGS. 8(A) and 8(B) are diagrams illustrating magnetic fields generated in a magnetic optical crystal in the form of, for example, a square pole, such as magnetic optical crystal 62 illustrated in various of the above embodiments of the present invention. Referring now to FIGS. 8(A) and 8(B), a magnetization 112 and demagnetizing fields 114 and 116 are generated in magnetic optical crystal 62. FIG. 8(A) shows the case where demagnetizing field 114 is generated in parallel with the side of magnetic optical crystal 62. This occurs when the magnetic field applied by an electromagnet and a permanent magnet is parallel to the side of magnetic optical crystal 62.

FIG. 8(B) shows the case where the magnetic field applied by an electromagnet and a permanent magnet is diagonal with respect to magnetic optical crystal 62. Demagnetizing field 116 is also diagonal with respect to magnetic optical crystal 62.

Demagnetizing field 114 generated in FIG. 8(A) is more intense than demagnetizing field 116 generated in FIG. 8(B). According to embodiments of the present invention, magnetization 112 is continuously in a saturated state, and the Faraday rotation angle is controlled by changing the direction of magnetization 112. When the intensity of demagnetizing fields 114 and 116 generated in the opposite direction of magnetization 112 varies depending on the direction, the magnetic field applied to magnetic optical crystal 62 becomes non-uniform to a certain extent. A non-uniform magnetic field will undesireably affect the Faraday rotation angle.

Figure 8C:
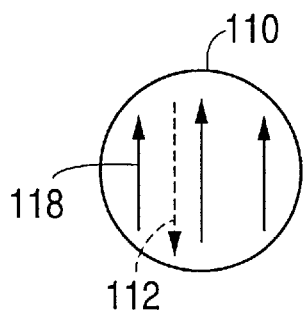
FIGS. 8(C) and 8(D) are diagrams illustrating magnetic fields generated in a magnetic optical crystal having a sphere-shape, according to embodiments of the present invention.
Figure 8D:
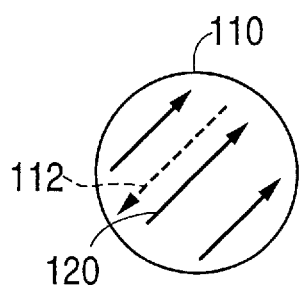

FIGS. 8(C) and 8(D) are diagrams illustrating magnetic fields generated in a magnetic optical crystal having a sphere-shape, such as magnetic optical crystal 110 illustrated in FIG. 7. Referring now to FIGS. 8(C) and 8(D), demagnetizing fields 118 and 120 are produced in magnetic optical crystal 110. Magnetic optical crystal 110 is direction-independent when it is sphere-shaped, and there is no difference in intensity between demagnetizing field 118 in FIG. 8(C) and demagnetizing field 120 in FIG. 8(D). Therefore, even if a magnetic field is applied to magnetic optical crystal 110 in a different direction, there is no change in the intensity of demagnetizing fields 118 and 120. As a result, a uniform magnetic field can be applied to magnetic optical crystal 110 and a Faraday rotation angle can be easily controlled.

Thus, according to an embodiment of the present invention as illustrated in FIG. 7, a magnetic field can be applied more evenly to a magnetic optical crystal without enlarging the size of the Faraday rotator.

A sphere-shaped magnetic optical crystal, such as magnetic optical crystal 110 in FIG. 7, functions as lens when it receives light. Therefore, this lens function should be considered when a sphere-shaped magnetic optical crystal is incorporated into a Faraday rotator.

A sphere-shaped magnetic optical crystal can be used in any of the previously described embodiments of the present invention. Particularly, it is possible to incline, or slant, magnetic core 64 and permanent magnets 70 and 72 with respect to optical path 68, as illustrated in FIG. 6(A), to obtain advantages as discussed above for the embodiment of the present invention illustrated in FIG. 6(A).

Figure 9:
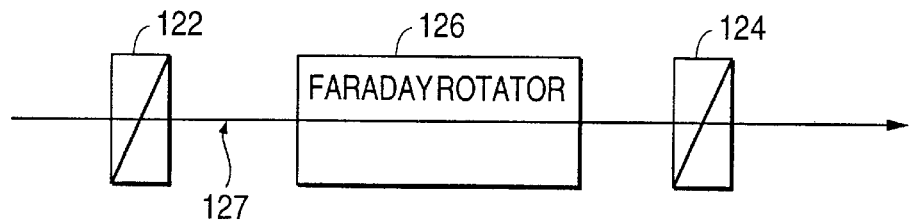
FIG. 9 is a diagram illustrating a Faraday rotator according to an embodiment of the present invention, as used in an optical switch, an optical attenuator and an optical isolator.

FIG. 9 is a diagram illustrating a Faraday rotator according to an embodiment of the present invention, as used in an optical switch, an optical attenuator and an optical isolator. Referring now to FIG. 9, an optical switch typically includes polarizers 122 and 124 passing polarizations inclining with respect to each other by 45°. A Faraday rotator 126 is a Faraday rotator according to the above embodiments of the present invention, and rotates an optical polarization plane in a range of +45° to −45°. To simply explanations, it is assumed that light enters from the direction of polarizer 122, and that an angle measured clockwise as viewed in the incident direction is a positive angle. Moreover, light travels along an optical path 127.

Light passed through polarizer 122 is straight polarized light having a specific polarization. When the light enters Faraday rotator 126, the polarization plane is rotated by +45° or −45°. Assume that polarizer 124 is set to pass through light which passed through polarizer 122 and is rotated by +45°. Therefore, the light can pass through polarizer 124 if it was rotated +45° by Faraday rotator 126. However, if the light is rotated −45° by Faraday rotator 126, the light will not pass through polarizer 124. Thus, an optical switch can switch ON/OFF an optical output by appropriately setting the Faraday rotation angle for received light.

By replacing polarizer 124 with a polarization separator, light is allowed to pass straight through when the Faraday rotation angle is +45°, and is allowed to pass in a different direction when the Faraday rotation angle is −45°. Thus, the optical switch can be configured to switch light to different optical paths.

If the Faraday rotation angle determined by the Faraday rotator 126 is set to continuously vary from −θ to +θ (where θ indicates a value of an optionally-set angle), then the optical output obtained by polarizer 124 continuously varies depending on the Faraday rotation angle assigned by Faraday rotator 126. For example, if polarizers 122 and 124 are set to indicate the same relationship as the above described optical switch, then the optical output can be gradually attenuated into the state in which no optical output can be detected by continuously changing the Faraday rotation angle from +45° to −45°, thereby realizing an optical attenuator.

The Faraday rotation angle can be controlled continuously with time by Faraday rotator 126 using an exclusive control device (not illustrated). In this case, the optical output from polarizer 124 functions as if it were a signal for changing the intensity with time. Thus, an optical modulator can be configured as illustrated in FIG. 9.

Figure 10:
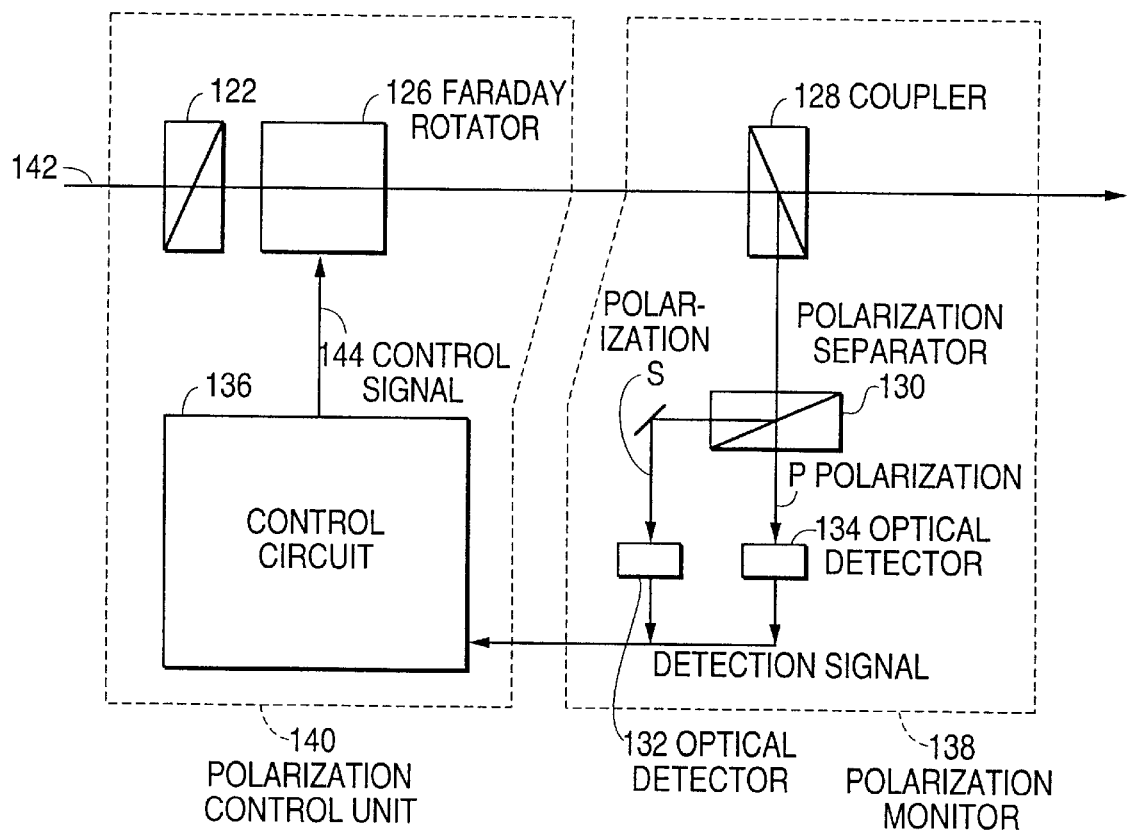
FIG. 10 is a diagram illustrating a Faraday rotator according to an embodiment of the present invention, as used in an optical polarizer.

FIG. 10 is a diagram illustrating a Faraday rotator according to an embodiment of the present invention, as used in an optical polarizer. Referring now to FIG. 10, a coupler 128 divides light output from Faraday rotator 126. A polarization separator 130 separates a P polarized light from an S polarized light. Optical detectors 132 and 134 detect the S and P polarized lights separated by polarization separator 130. A control circuit 136 controls the Faraday rotation angle of Faraday rotator 126 based on the detection results of optical detectors 132 and 134. A polarization monitor 138 comprises coupler 128, polarization separator 130, and optical detectors 132 and 134. A polarization control unit 140 comprises Faraday rotator 126, polarizer 122, and control circuit 136.

An optical signal 142 is processed into a straight polarized line through polarizer 122 and is received by Faraday rotator 126 in polarization control unit 140. In Faraday rotator 126, the polarization plane of optical signal 142 is rotated at a predetermined angle to change the polarization state.

Coupler 128 in polarizing monitor 138 divides a received optical signal 142 into two lights without changing the polarization state of optical signal 142. One portion of the divided optical signal is input to polarization separator 130 and divided into an S polarized light and a P polarized light. Optical detector 132 detects the intensity of the S polarized light while optical detector 134 detects the intensity of the P polarized light. The polarization state of optical signal 142 output from Faraday rotator 126 is detected by dividing the optical signal 142 output from Faraday rotator 126 into the S and P polarized elements and detecting their optical intensity.

The optical intensity of the polarized light detected by optical detectors 132 and 134 is transmitted as a detection signal to control circuit 136 of polarization control unit 140. Control circuit 136 computes the polarization state of optical signal 142 output from Faraday rotator 126 based on the optical intensity of the S and P polarized lights. Control circuit 136 also computes the amount of electric current required for, and provided to, an electromagnet (not illustrated) of Faraday rotator 126 to produce a desired polarization state. Control circuit 136 provides the result as a control signal 144 to Faraday rotator 126. In accordance with control signal 144, Faraday rotator 126 provides an electric current to the electromagnet to control the Faraday rotation angle. Therefore, with an optical polarizer as illustrated in FIG. 10, an optical signal having a desired polarization state can be obtained.

According to the above embodiments of the present invention, a Faraday rotator includes a magnetic optical element and a magnetic field generating unit. The magnetic optical element has an optical path extending therethrough. For example, see magnetic optical crystal 62 in FIGS. 4(A) and 6(A), and magnetic optical crystal 110 in FIG. 7. The magnetic field generating unit is positioned so as not to obstruct the optical path, and generates a uniform magnetic field in the magnetic optical element. For example, in FIG. 4(A), electromagnet 66 and permanent magnets 70 and 72 represent a magnetic field generating unit which generates a uniform magnetic field in a magnetic optical element. Also, electromagnet 66 and permanent magnets 70 and 72 in FIGS. 6(A) and 7 represent such a magnetic field generating unit.

Moreover, according to above embodiments of the present invention, a first magnet unit is positioned so as not to obstruct the optical path, and generates a magnetic field passing through a magnetic optical element. For example, permanent magnets 70 and 72 in FIGS. 4(A), 6(A) and 7 form such a first magnet unit. A second magnet unit is positioned so as not to obstruct the optical path, and generates a magnetic field passing through the magnetic optical element. For example, electromagnet 66 in FIGS. 4(A), 6(A) and 7 form such a second magnet unit. The magnet field generated by the second magnet unit is preferably perpendicular to the magnetic field generated by the first magnet unit, and together produce a uniform magnetic field in the magnetic optical element.

According to embodiments of the present invention, the magnetic field generated by permanent magnets or an electromagnet can be oblique with respect to an optical path extending through an magnetic optical element. For example, see FIG. 6(A). Also, as illustrated in FIG. 6(A), a magnetic field generated by either a permanent magnet or an electromagnet can be inclined in the range of 0° to 45° with respect to the optical path, or with respect to a normal to the optical path.

However, in other embodiments of the present invention, the magnetic field generated by permanent magnets is parallel to the optical path, and the magnetic field generated by an electromagnet is perpendicular to the optical path. A conventional Faraday rotator typically uses electromagnets to create a magnetic field which is parallel to the optical path. By using permanent magnets to create a magnet field which is parallel to the optical path, the length of the Faraday rotator can be made shorter along the direction of the optical path.

According to embodiments of the present invention, a Faraday rotator can have a first magnet unit (for example, permanent magnets 70 and 71 in FIG. 4(A) together form such a first magnet unit) and a second magnet unit (for example, electromagnet 66 in FIG. 4(A) forms such a second magnet unit). The first magnet unit does not obstruct the optical path and has first and second portions adjacent to opposite sides of a magnetic optical element so that the entire magnetic optical element is between the first and second portions. (For example, permanent magnet 70 represents the "first portion" and permanent magnet 72 represents the "second portion".) The first and second portions of the first magnet unit together generate a magnetic field passing through the magnetic optical element. The second magnet unit does not obstruct the optical path and has first and second portions adjacent to opposite sides of the magnetic optical element so that the entire magnetic optical element is between the first and second portions of the second magnet unit. (For example, the N pole of electromagnet 66 represents the first portion and the S pole represents the second portion.) The opposite sides of the magnetic optical element are different from the opposite sides at which the first and second portions of the first magnet unit are positioned. The first and second portions of the second magnet unit together generate a magnetic field passing through the magnetic optical element. The magnetic fields generated by the first and second magnet units interact together to form a resulting magnetic field applied to the magnetic optical element.

As indicated above, a first magnet unit has first and second portions adjacent to opposite sides of a magnetic optical element so that the entire magnetic optical element is between the first and second portions. For example, as can be seen in FIGS. 4(A), 6(A) and 7, permanent magnets 70 and 72 represent first and second portions, respectively, of a first magnet unit. A magnetic optical crystal is entirely between the first and second portions. This can be contrasted to the Faraday rotator illustrated in FIG. 1(A), where the entire magnetic optical crystal 20 is not between the poles of electromagnet 22. Instead, the poles of electromagnet 22 only cover a portion of magnetic optical crystal 20. Therefore, the entire magnetic optical crystal 20 is not between the poles of electromagnet 22.

According to the above embodiments of the present invention, a small and precise system can be realized by designing optical devices using a Faraday rotator capable of applying a uniform magnetic field to a magnetic optical crystal.

Further, according to the above embodiments of the present invention, a small, easily-equipped, and variable-rotation-angle Faraday rotator can be realized, with a uniform magnetic field being applied to a magnetic optical crystal that passes light therethrough.

According to the above embodiments of the present invention, a Faraday rotator can be produced without using a plurality of expensive electromagnets to produce a uniform magnetic field in a direction parallel to or crossing an optical path. Moreover, a Faraday rotator according to the above embodiments of the present invention can be produced with relatively inexpensive and small electromagnets. Moreover, the electromagnet and permanent magnets can be appropriately positioned so as not to obstruct the optical path of light passing through the Faraday rotator. Therefore, conventional shaped electromagnets and permanent magnets can be used without obstructing the optical path, instead of requiring unique shaped electromagnets and/or permanent magnets. By using conventional shaped electromagnets and permanent magnets, the manufacturing costs of the Faraday rotator are relatively low.

Furthermore, according to the above embodiments of the present invention, a Faraday rotator can use a sphere-shaped magnetic optical crystal. As a result, the direction-dependence of a demagnetizing field generated by applying a magnetic field can be eliminated. Therefore, since the intensity of the demagnetizing field remains unchanged even if the direction of an applied magnetic field is changed, a more uniform magnetic field can be applied and a Faraday rotation angle can be easily controlled.

According to the above embodiment of the present invention, conventional-shaped permanent magnets and a convention-shaped core of an electromagnet can be used in a Faraday rotator to apply a uniform magnetic field to a magnetic optical crystal, without modifying the shapes or drilling holes in the permanent magnets or the core to allow a light path to pass unobstructed through the Faraday rotator.

Furthermore, according to the above embodiments of the present invention, two or more permanent magnets can be used to apply a uniform magnetic field to a magnetic optical crystal. A permanent magnet is smaller than an electromagnet, but provides a stronger magnetic field than the electromagnet. Therefore, permanent magnets can be used to provide a uniform magnetic field without resulting in a large-size Faraday rotator. Also, the present invention is not limited to using two or more permanent magnets. Instead, a signal permanent magnet can be used.

In addition, according to the above embodiments of the present invention, a single electromagnet can be used to apply a uniform magnetic field to a magnetic optical crystal. Electromagnets are relatively large. Therefore, the Faraday rotator is smaller as compared to a Faraday rotator using a plurality of electromagnets to generate a uniform magnetic field.

According to the above embodiments of the present invention, a magnetic optical crystal can be sphere-shaped to prevent a magnetic field from being uneven, or non-uniform, due to a demagnetizing field in the magnetic optical crystal. That is, since the intensity of the demagnetizing field is prevented from varying by the variable direction in which a magnetic field is applied, the magnetic field applied to the magnetic optical crystal can be made more uniform.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A Faraday rotator comprising:
   a magnetic optical element having an optical path extending therethrough; and
   a magnetic field generating unit positioned so as not to obstruct the optical path and generating a uniform magnetic field in the magnetic optical element, wherein the magnetic field generating unit comprises
      a first magnet unit positioned so as not to obstruct the optical path and generating a magnetic field passing through the magnetic optical element, and
      a second magnet unit positioned so as not to obstruct the optical path and generating a magnetic field passing through the magnetic optical element, the magnetic field generated by the second magnet unit being not parallel to the magnetic field generated by the first magnet unit and combining with the magnetic field generated by the first magnet unit to produce the uniform magnetic field.

2. A Faraday rotator as in claim 1, wherein the magnetic optical element is square shaped.

3. A Faraday rotator as in claim 1, wherein the magnetic optical element is sphere shaped.

4. A Faraday rotator as in claim 1, wherein the magnetic field generated by the first magnet unit is oblique with respect to the optical path.

5. A Faraday rotator as in claim 1, wherein the magnetic field generated by the first magnet unit is inclined in the range of 0° to 45° with respect to a normal to the optical path.

6. A Faraday rotator as in claim 1, wherein the Faraday rotator is used in an optical device which is one of an optical switch, an optical attentuator and an optical modulator, to rotate the polarization of light passing through the optical device.

7. A Faraday rotator as in claim 1, wherein the magnetic field generated by the second magnet unit is perpendicular to the magnetic field generated by the first magnet unit.

8. A Faraday rotator comprising:
   a magnetic optical element having an optical path extending therethrough; and
   a magnetic field generating unit positioned so as not to obstruct the optical path and generating a uniform magnetic field in the magnetic optical element, wherein the magnetic field generating unit comprises
      a permanent magnet unit positioned so as not to obstruct the optical path and generating a magnetic field passing through the magnetic optical element, and
      an electromagnet positioned so as not to obstruct the optical path and generating a magnetic field passing through the magnetic optical element, the magnetic field generated by the electromagnet being not parallel to the magnetic field generated by the permanent magnet unit and combining with the magnetic field generated by the permanent magnet unit to produce the uniform magnetic field.

9. A Faraday rotator as in claim 8, wherein the magnetic field generated by the permanent magnet unit is parallel to the optical path and the magnetic field generated by the electromagnet is perpendicular to the optical path.

10. A Faraday rotator as in claim 8, wherein the magnetic optical element is square shaped.

11. A Faraday rotator as in claim 8, wherein the magnetic optical element is sphere shaped.

12. A Faraday rotator as in claim 8, wherein the magnetic field generated by the permanent magnet unit is oblique with respect to the optical path.

13. A Faraday rotator as in claim 8, wherein the magnetic field generated by the permanent magnet unit is inclined in the range of 0° to 45° with respect to the optical path.

14. A Faraday rotator as in claim 8, wherein the magnetic field generated by the permanent magnet unit is inclined in the range of 0° to 45° with respect to a normal to the optical path.

15. A Faraday rotator as in claim 8, wherein the permanent magnet unit comprises first and second permanent magnets symmetrically positioned around the magnetic optical element and which together generate the magnetic field generated by the permanent magnet unit.

16. A Faraday rotator as in claim 15, wherein the first and second permanent magnets each produce a magnetic field which travels in an open magnetic path, the magnetic field produced by the first permanent magnet combining with the magnetic field produced by the second permanent magnet to generate the magnetic field generated by the permanent magnet unit.

17. A Faraday rotator as in claim 8, wherein the magnetic field generated by the electromagnet is perpendicular to the magnetic field generated by the permanent magnet unit.

18. A Faraday rotator comprising:
   a magnetic optical element having an optical path extending therethrough;
   a first magnet unit which does not obstruct the optical path and has first and second portions adjacent to opposite sides of the magnetic optical element so that the entire magnetic optical element is between the first and second portions, the first and second portions together generating a magnetic field passing through the magnetic optical element; and a second magnet unit which does not obstruct the optical path and has first and second portions adjacent to opposite sides of the magnetic optical element so that the entire magnetic optical element is between the first and second portions, the opposite sides being different from the opposite sides at which the first and second portions of the first magnet unit are positioned, the first and second portions of the second magnet unit together generating a magnetic field passing through the magnetic optical element, the magnetic field generated by the first magnet unit and the magnetic field generated by the second magnet unit interacting together to form a resulting magnetic field applied to the magnetic optical element.

19. A Faraday rotator as in claim 18, wherein the resulting magnetic field is uniform in the magnetic optical element.

20. A Faraday rotator as in claim 18, wherein the magnetic field generated by the first magnet unit is perpendicular to the magnetic field generated by the second magnet unit.

21. A Faraday rotator as in claim 18, wherein the magnetic field generated by the first magnet unit is parallel to the optical path and the magnetic field generated by the second magnet unit is perpendicular to the optical path.

22. A Faraday rotator as in claim 18, wherein:
the first magnet unit comprises at least one permanent magnet for generating the magnetic field generated by the first magnet unit, the magnetic field generated by the first magnet unit being parallel to the optical path; and
the second magnet unit is an electromagnet, and the magnetic field generated by the second magnet unit is perpendicular to the optical path.

23. A Faraday rotator as in claim 18, wherein the magnetic optical element is square shaped.

24. A Faraday rotator as in claim 18, wherein the magnetic optical element is sphere shaped.

25. A Faraday rotator as in claim 18, wherein the magnetic field generated by the first magnet unit is oblique with respect to the optical path.

26. A Faraday rotator as in claim 25, wherein the magnetic field generated by the second magnet unit is perpendicular to the magnetic field generated by the first magnet unit.

27. A Faraday rotator as in claim 18, wherein the Faraday rotator is used in an optical device which is one of an optical switch, an optical attenuator and an optical modulator, to rotate the polarization of light passing through the optical device.

28. A Faraday rotator comprising:
a magnetic optical element having an optical path extending therethrough;
first and second permanent magnets which do not obstruct the optical path and are positioned adjacent to opposite sides of the magnetic optical element so that the entire magnetic optical element is between the first and second permanent magnets, the first and second permanent magnets together generating a magnetic field passing through the magnetic optical element; and
an electromagnet which does not obstruct the optical path and has first and second poles adjacent to opposite sides of the magnetic optical element so that the entire magnetic optical element is between the first and second poles, the opposite sides being different from the opposite sides at which the first and second permanent magnets are positioned, the electromagnet generating a magnetic field from the first pole to the second pole and passing through the magnetic optical element, the magnetic field generated by the first and second permanent magnets and the magnetic field generated by the electromagnet being perpendicular to each other and interacting together to form a resulting magnetic field applied to the magnetic optical element.

29. A Faraday rotator as in claim 28, wherein the resulting magnetic field is uniform in the magnetic optical element.

30. A Faraday rotator as in claim 28, wherein the magnetic field generated by the first and second permanent magnets is parallel to the optical path.

31. A Faraday rotator as in claim 28, wherein the magnetic optical element is square shaped.

32. A Faraday rotator as in claim 28, wherein the magnetic optical element is sphere shaped.

33. A Faraday rotator as in claim 28, wherein the magnetic field generated by the first and second permanent magnets is oblique with respect to the optical path.

34. A Faraday rotator as in claim 28, wherein the Faraday rotator is used in an optical device which is one of an optical switch, an optical attenuator and an optical modulator, to rotate the polarization of light passing through the optical device.

35. A Faraday rotator as in claim 28, wherein the first and second permanent magnets each produce a magnetic field which travels in an open magnetic path, the magnetic field produced by the first permanent magnet combining with the magnetic field produced by the second permanent magnet to form the magnetic field generated by the first and second permanent magnets and passing through the magnetic optical element.

36. A Faraday rotator comprising:
a magnetic optical element having an optical path extending therethrough;
a first magnet unit positioned in the optical path and having an optical passage slot which allows light travelling along the optical path to pass unobstructed through the first magnet unit and the magnetic optical element, the first magnet unit generating a magnetic field in the magnetic optical element; and
a second magnet unit positioned so as not to obstruct the optical path and generating a magnetic field passing through the magnetic optical element, the magnetic field generated by the second magnet unit being not parallel to the magnetic field generated by the first magnet unit and combining with the magnetic field generated by the first magnet unit to produce a resulting magnetic field applied to the magnetic optical element.

37. A Faraday rotator as in claim 36, wherein:
the first magnet unit is an electromagnet, and
the second magnet unit comprises a permanent magnet for generating the magnetic field generated by the second magnet unit.

38. A Faraday rotator as in claim 36, wherein the magnetic field generated by the second magnet unit is perpendicular to the magnetic field generated by the first magnet unit.

39. A Faraday rotator comprising:
a magnetic optical element having an optical path extending therethrough;
a first magnet unit which does not obstruct the optical path and has first and second portions adjacent to opposite sides of the magnetic optical element so that the magnetic optical element is between the first and second portions, the first and second portions together generating a magnetic field passing through the magnetic optical element; and
a second magnet unit having first and second portions adjacent to opposite sides of the magnetic optical element so that the magnetic optical element is between the first and second portions, the opposite sides being different from the opposite sides at which the first and second portions of the first magnet unit are positioned, the second magnet unit extending through the optical path and having an optical passage slot which allow light travelling along the optical path to pass unobstructed through the second magnet unit and the magnetic optical element, the first and second portions of the second magnet unit together generating a magnetic field passing through the magnetic optical element, wherein the magnetic field generated by the first magnet unit and the magnetic field generated by the second magnet unit interacting together to form a resulting magnetic field applied to the magnetic optical element.

40. A Faraday rotator comprising:

a magnetic optical element having an optical path extending therethrough; and a magnetic field generating unit positioned so as not to obstruct the optical path and generating a uniform magnetic field in the magnetic optical element, wherein the magnetic field generating unit comprises a first magnet unit positioned so as not to obstruct the optical path and generating a magnetic field passing through the magnetic optical element, and a second magnet unit positioned so as not to obstruct the optical path and generating a magnetic field passing through the magnetic optical element, the magnetic field generated by the second magnet unit being perpendicular to the magnetic field generated by the first magnet unit and combining with the magnetic field generated by the first magnet unit to produce the uniform magnetic field.

41. A Faraday rotator as in claim 40, wherein the magnetic field generated by the first magnet unit is oblique with respect to the optical path.

42. A Faraday rotator as in claim 40, wherein the magnetic field generated by the first magnet unit is inclined in the range of 0° to 45° with respect to a normal to the optical path.

43. A Faraday rotator comprising:

a magnetic optical element having an optical path extending therethrough; and a magnetic field generating unit positioned so as not to obstruct the optical path and generating a uniform magnetic field in the magnetic optical element, wherein the magnetic field generating unit comprises a permanent magnet unit positioned so as not to obstruct the optical path and generating a magnetic field passing through the magnetic optical element, and an electromagnet positioned so as not to obstruct the optical path and generating a magnetic field passing through the magnetic optical element, the magnetic field generated by the electromagnet being perpendicular to the magnetic field generated by the permanent magnet unit and combining with the magnetic field generated by the permanent magnet unit to produce the uniform magnetic field.

44. A Faraday rotator as in claim 43, wherein the magnetic optical element is square shaped.

45. A Faraday rotator as in claim 43, wherein the magnetic optical element is sphere shaped.

46. A Faraday rotator as in claim 43, wherein the magnetic field generated by the permanent magnet unit is oblique with respect to the optical path.

47. A Faraday rotator as in claim 43, wherein the magnetic field generated by the permanent magnet unit is inclined in the range of 0° to 45° with respect to the optical path.

48. A Faraday rotator as in claim 43, wherein the magnetic field generated by the permanent magnet unit is inclined in the range of 0° to 45° with respect to a normal to the optical path.

49. A Faraday rotator as in claim 43, wherein the permanent magnet unit comprises first and second permanent magnets symmetrically positioned around the magnetic optical element and which together generate the magnetic field generated by the permanent magnet unit.

50. A Faraday rotator as in claim 49, wherein the first and second permanent magnets each produce a magnetic field which travels in an open magnetic path, the magnetic field produced by the first permanent magnet combining with the magnetic field produced by the second permanent magnet to generate the magnetic field generated by the permanent magnet unit.

51. A Faraday rotator comprising:

a magnetic optical element having an optical path extending therethrough;

a first magnet unit positioned in the optical path and having an optical passage slot which allows light travelling along the optical path to pass unobstructed through the first magnet unit and the magnetic optical element, the first magnet unit generating a magnetic field in the magnetic optical element; and a second magnet unit positioned so as not to obstruct the optical path and generating a magnetic field passing through the magnetic optical element, the magnetic field generated by the second magnet unit being perpendicular to the magnetic field generated by the first magnet unit and combining with the magnetic field generated by the first magnet unit to produce a resulting magnetic field applied to the magnetic optical element.

52. A Faraday rotator as in claim 51, wherein:

the first magnet unit is an electromagnet, and the second magnet unit comprises a permanent magnet for generating the magnetic field generated by the second magnet unit.

* * * * *